United States Patent [19]
Walker et al.

[11] 4,129,384
[45] Dec. 12, 1978

[54] OPTICAL EXTENSOMETER

[75] Inventors: Ray A. Walker, Kennewick; Fred R. Reich; James T. Russell, both of Richland, all of Wash.

[73] Assignee: Batelle Memorial Institute, Columbus, Ohio

[21] Appl. No.: 804,814

[22] Filed: Jun. 8, 1977

[51] Int. Cl.² .................................. G01B 11/08
[52] U.S. Cl. .................. 356/381; 356/383; 356/387
[58] Field of Search .............. 356/156, 159, 160, 167

[56] References Cited
U.S. PATENT DOCUMENTS

| | | | |
|---|---|---|---|
| 3,853,406 | 12/1974 | Zanoni | 356/160 |
| 3,870,890 | 3/1975 | Binks et al. | 356/160 |
| 3,905,705 | 9/1975 | Petrohilos | 356/160 |

Primary Examiner—John K. Corbin
Assistant Examiner—R. A. Rosenberger
Attorney, Agent, or Firm—Klarquist, Sparkman, Campbell, Leigh, Hall & Whinston

[57] ABSTRACT

An optical extensometer is described using sequentially pulsed light beams for measuring the dimensions of objects by detecting two opposite edges of the object without contacting the object. The light beams may be of different distinguishable light characteristics, such as polarization or wave length, and are time modulated in an alternating manner at a reference frequency. The light characteristics are of substantially the same total light energy and are distributed symmetrically. In the preferred embodiment two light beam segments of one characteristic are on opposite sides of a middle segment of another characteristic. As a result, when the beam segments are scanned sequentially across two opposite edges of the object, they produce a readout signal at the output of a photoelectric detector that is compared with the reference signal by a phase comparator to produce a measurement signal with a binary level transition when the light beams cross an edge. The light beams may be of different cross sectional geometries, including two superimposed and concentric circular beam cross sections of different diameter, or two rectangular cross sections which intersect with each other substantially perpendicular so only their central portions are superimposed. Alternately, a row of three light beams can be used including two outer beams on opposite sides and separate from a middle beam. The three beams may all be of the same light characteristic. However it is preferable that the middle beam be of a different characteristic but of the same total energy as the two outer beams.

24 Claims, 7 Drawing Figures

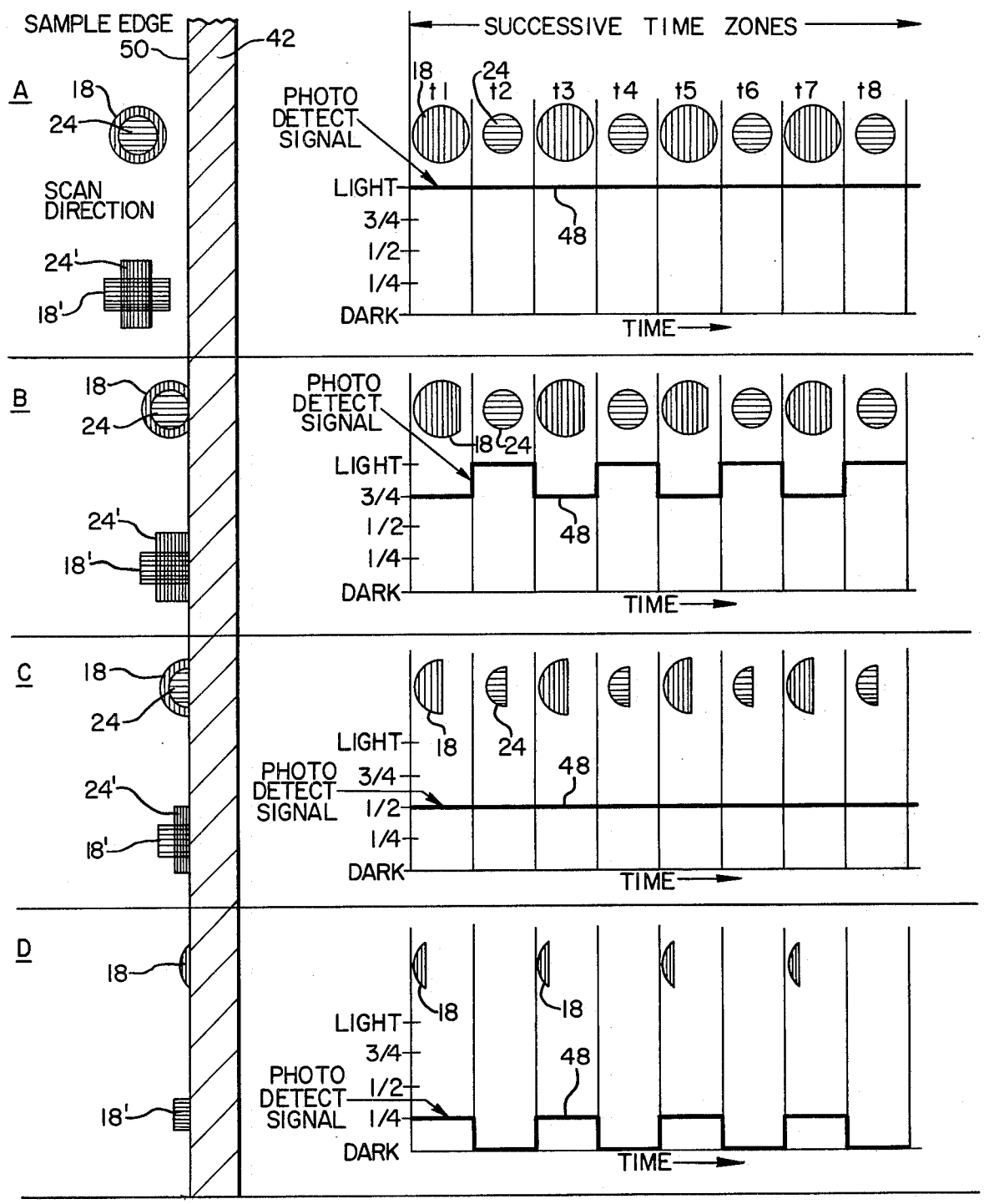
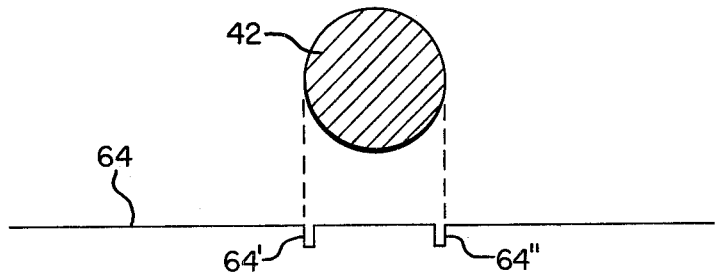
FIG. 3
FIG. 4

OPTICAL EXTENSOMETER

BACKGROUND OF INVENTION

The subject matter of the present invention relates generally to an optical dimension measuring apparatus for sensing two opposite edges of an object to measure the dimensions of such object without contacting it. In particular, the present invention relates to an optical extensometer that scans the object with sequentially pulsed light beams of different light characteristics which are time modulated in an alternating manner. The pulsed light beams produce a measurement signal with a binary level transition when the beams cross the opposite edges of the object to precisely locate such edges.

The optical extensometer of the present invention is especially useful in making accurate high speed measurements of objects under test conditions or at remote locations where it is not possible to contact the object. For example, it can be used as a non-contacting strain gauge for measuring dimensional changes of a sample in an environmental chamber while the sample is heat cycled or mechanically stressed at high rates. Another use is to gauge the dimensions of objects in radioactive radiation cells, wind tunnels or other environmental chambers during varying thermal or atmospheric conditions. The optical extensometer can be used to measure the dimensions of small delicate objects, such as integrated circuits, or large objects such as logs and lumber.

It has previously been proposed to provide an optical dimension measuring apparatus for determining the size of a sample by measuring the time it takes to scan a laser light beam between the opposite edges of such object. If the scanning velocity of the light beam is known and the scanning time measured, the dimension of the object can be determined by multiplying these two factors together. However, such prior measurement system is not sufficiently accurate due to changes in the scanning velocity, instability in the laser light output instability in the gain of the photodetection system or in the threshhold reference voltage of the comparator circuit connected to the output of the photodetector. One such system using a single scanned light beam is described in the article, "Laser Extensometer," by W. J. Coleman, *Instrumentation Technology Journal* of *Instrument Society of America*, January 1967. Another similar system using a dithered, pulsed light beam is shown in the article "Rapid, Precise Computer-Controlled Measurement of X-Y Coordinates," by M. Kallmeyer et al, *IBM J. Res. Develop.*, November 1973, pp. 490–499. This system does not use a phase comparator but differentiates and then zero detects the measurement signal.

The optical extensometer of the present invention overcomes these disadvantages and has greater measurement accuracy, resolution, repeatability and range. Thus, one embodiment of the invention with a beam diameter of 0.002 inch has a measurement accuracy of $\pm 20 \times 10^{-6}$ inch.

In one embodiment of the present invention the extensometer is capable of measuring dimensional changes along two mutually perpendicular axes, and with slight modifications, can also be made to sense along a third axis to indicate three dimensional changes in objects.

Other optical dimensional measuring apparatus employing a pair of scanned light beams are shown in U.S. Pat. No. 3,853,406 of Zanoni granted Dec. 10, 1974 and U.S. Pat. No. 3,740,152 of Iisuka, granted June 19, 1973. However, in neither of these patents is a pair of pulsed or time modulated light beams employed. Also, none of the above discussed references use three beam segments of two different light characteristics which are symmetrically deposed with two segments of one characteristic on opposite sides of a middle segment of the other characteristic, and are scanned sequentially across the opposite edges of the object to produce a measurement signal which changes polarity at such edges in the manner of the present invention. In the Zanoni patent, the light beams are continuous, not pulsed, and are spaced apart a known distance so that they sequentially scan the object. Also, the opposite edges of the object are not determined by phase comparison of the measurement signal with a reference signal, but instead are determined by first and second differentiation of the measurement signal. The Iisuka patent does show the use of a phase detector in an optical dimensional measuring apparatus, but does not employ pulsed light beams of different light characteristics and does not scan the beams across the edges of an object. Instead, it employs a double image optical sysem and transmits a real double image of the object through a vibrated scanning mask which spacially modulates the light image, rather than time modulated or pulsing the light beam. U.S. Pat. No. 3,907,400 of W. Eichenberger et al, granted Sept. 23, 1975, is of interest because it shows a thread monitoring system using a pair of sequentially pulsed light beams. However, such light beams are not scanned across the opposite edges of an object to measure a dimension of such object.

SUMMARY OF INVENTION

It is therefore one object of the present invention to provide an improved optical dimension measuring apparatus of high accuracy.

Another object of the invention is to provide such an apparatus which measures the dimensions of an object without contacting such object by detecting the opposite edges of the object with sequentially pulsed time modulated light beams of different light characteristics.

A further object of the invention is to provide such an apparatus which is capable of making accurate, high speed dimension measurements of objects in remote locations of under varying conditions.

An additional object of the invention is to provide such a measuring apparatus in which a measurement signal is produced with a binary level transition when the light beams cross the edge of the object for easier detection of such signal.

Still another object of the present invention is to provide such a measuring apparatus in which the time modulated light beams scanned across the object are detected to produce high frequency electrical readout signals whose phase is compared with that of a reference signal used to modulate the light beams, in order to produce the measurement signal.

A still further object of the present invention is to provide such a measuring apparatus in which the light beams are of different light characteristics of the same total energy that are provided as two light beam segments of one characteristic on opposite sides of a middle beam segment of the other characteristic, and such segments are scanned sequentially across the edges of the object.

DRAWINGS

Other objects and advantages of the present invention will be apparent from the following detailed description of several preferred embodiments thereof and from the attached drawings of which:

FIGS. 3A to 3D show the light beams in different scanning positions and the corresponding electrical readout signals produced by the photodetector;

FIG. 4 shows the measurement output signal of the phase detector produced with the light beams cross the opposite edges of the object;

DESCRIPTION OF PREFERRED EMBODIMENTS

Figure 1:
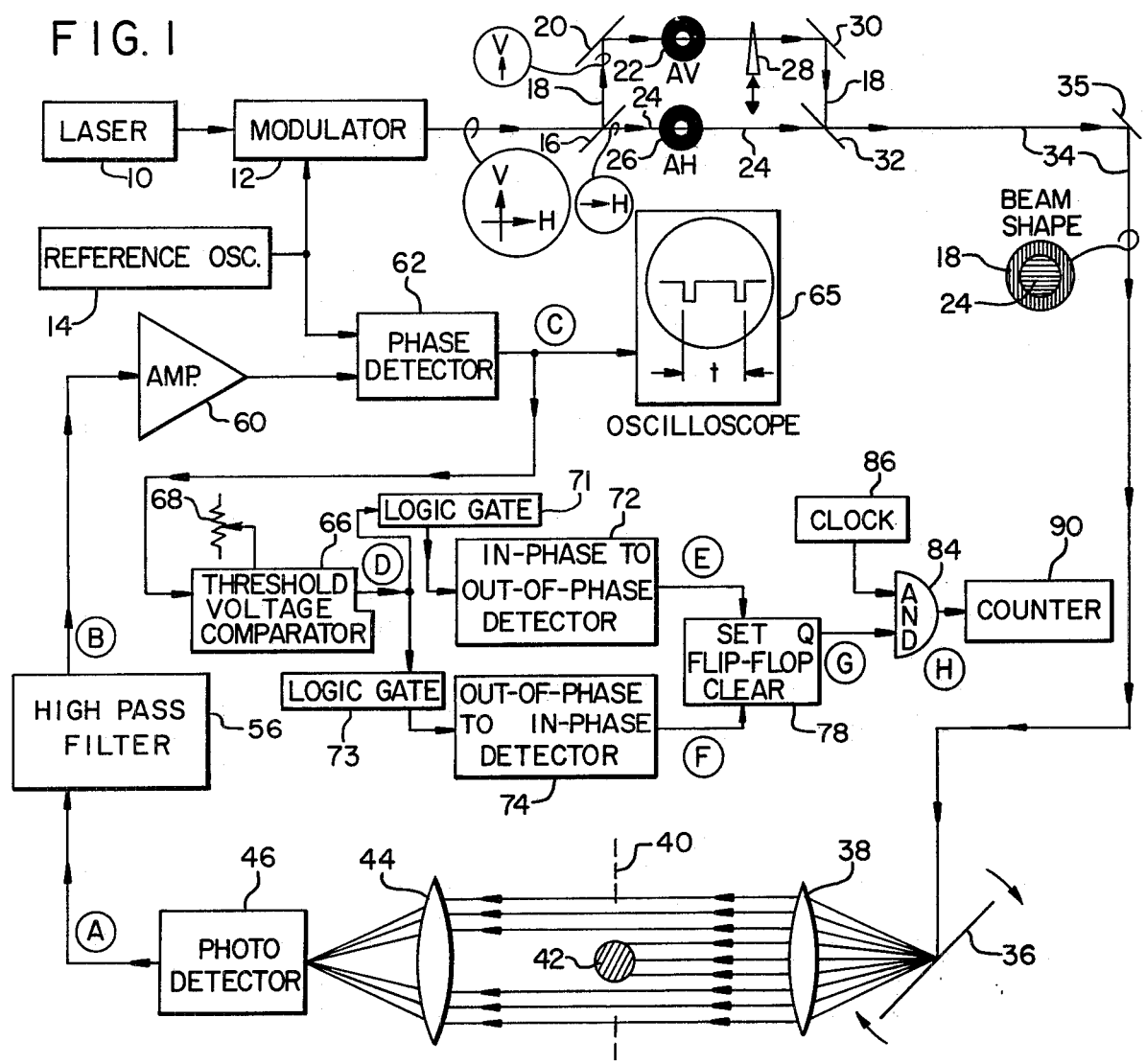
FIG. 1 is a schematic diagram of an optical extensometer in accordance with one embodiment of the present invention.

As shown in FIG. 1, one embodiment of the present invention includes a light source 10, such as a laser, which produces a light beam that is transmitted through a light modulator 12. The modulator 12 may be the light polarizing modulator, such as a Pockells cell, or a light wavelength modulator, such as a filter wheel with two different band pass filters, to which an electrical modulation signal is applied by a reference oscillator 14 having a high frequency of, for example, 25 megahertz. As a result, a pair of sequentially pulsed, time modulated light beams of different light characteristics, such as vertical and horizontal polarization, are produced at the output of the modulator. The two pulsed polarized light beams are directed onto a polarization sensitive mirror 16. The mirror 16 is polarized to reflect vertically polarized light beam 18 and to transmit a horizontally polarized light beam 24.

The vertically polarized light beam 18 is reflected from mirror 16 off a conventional mirror 20 and transmitted through a central aperture in a light opaque mask member 22. To form a circular beam, the mask member 22 is provided with a circular aperture which limits the shape of the cross section of such beam. Similarly the horizontally polarized light beam 24 is transmitted through another mask 26 whose circular aperture limits the shape of the cross section of that beam. The apertures in the masks 22 and 26 are of different diameters. Thus, the diameter of the aperture of mask 22 may be slightly larger than that of mask 26 so that the vertically polarized light beam 18 is of slightly larger diameter than the horizontally polarized light beam 24. In order to make the two masked light beams provide two light characteristics of the same total light energy, a light absorber or attenuator 28, such as a neutral density filter, can be provided in the path of either beam 18 or 24 as appropriate and is adjusted in position until the total energy of the two beams is the same when they are combined at the output of mirror 32.

The vertically polarized light beam 18 is reflected off another conventional mirror 30 down to a polarization sensitive mirror 32, which like miror 16 reflects vertically polarized light and transmits horizontally polarized light. As a result, the two light beams 18 and 24 are recombined and transmitted along a common beam axis as a combined beam 34 of two pulsed or time modulated light beams which are superimposed but are sequentially pulsed. The combined beams 34 are reflected down by a fixed mirror 35 to a moving scanning mirror 36. The scanning mirror rotates about a horizontal axis to scan the combined light beams 34 across a focusing lens 38 which focuses the apertures of masks 22 and 26 on a plane 40 passing through the center of an object 42 being measured. The apertures of masks 22 and 26 are imaged at plane 40. Alternatively, collimated laser beams could be focused at plane 40 if due regard is paid to the diffraction effects of the lens 38. A portion of the pulsed light beams is blocked by the object 42 while the remainder of the beam outside the opposite edges of such object is transmitted through a second focusing lens 44 which focuses the light beam onto a photoelectric detector 46, such as a photomultiplier tube.

Figure 2:
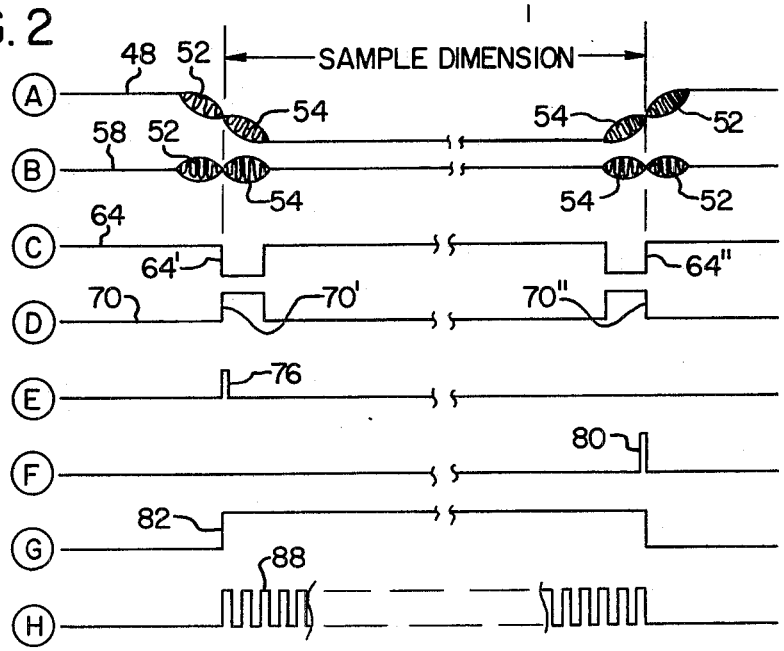
FIGS. 2A to 2H show the electrical signal waveforms produced in the circuit of the apparatus of FIG. 1.

As shown in FIGS. 2 and 3, the output of the photoelectric detector 46 is an electrical readout signal 48 which changes amplitude and phase as the two superimposed light beams are scanned across the edge 50 of the object or sample 42. As shown in FIG. 3A, when both light beams 18 and 24 have not yet crossed the edge 50 of the object, the maximum amount of light is transmitted to the photoelectric detector, and the output signal 48 of such detector is at a substantially constant maximum amplitude. However, when the larger diameter light beam 18 first crosses the edge 50 before the smaller diameter light beam 24 crosses such edge, as shown in FIG. 3B, the output signal 48 of the light detector decreases to a lower level of, for example, ¾ its maximum amplitude during the time beam 18 is turned on while it returns to its maximum amplitude level during the time beam 24 is turned on. This is shown as a square wave pulse with positive going pulses occurring during beam 24 and negative going pulses occurring during beam 18, such pulses having a repetition rate equal to the frequency of the reference oscillator 14.

When both of the light beams 18 and 24 are one half way across the edge 50, as shown in FIG. 3C, the light detector output signal 48 drops to an amplitude approximately one half its maximum amplitude and remains constant for both light beams 18 and 24. This is possible because although the remaining one half portion of beam 18 is larger than the remaining one half portion of beam 24, such portions are of the same light energy. However, as the light beams continue to scan from the position shown in FIG. 3C to the position shown in FIG. 3D, the smaller light beam 24 is completely covered by the object, while the larger beam 18 is still partially transmitted to the light detector. As a result the output signal 48 in FIG. 3D is formed by positive going pulses corresponding to beam 18 and negative going pulses corresponding to the time when beam 24 would normally occur. Thus it can be seen that the output signal 48 in FIG. 3D is 180° out of phase with respect to the output signal 48 in FIG. 3B.

The effect of the above high frequency modulation of the light detector output signal 48 is shown in FIG. 2A. It includes a high frequency "in phase" modulation portion 52 corresponding to the output signal 48 of FIG. 3B which is in phase with the reference oscillator 14. It also includes a high frequency modulation "out of phase" signal portion 54 corresponding to the output signal 48 of FIG. 3D which is 180° out of phase with respect to the reference oscillator 14 and the signal portion 52. It should be noted that the frequency of the envelope of the high frequency modulations 52 and 54 is determined by the scanning speed of the light beams as set by the speed of rotation of scanning mirror 36.

The output signal 48 of the detector is transmitted through a high frequency pass filter 56 which removes the DC component and produces the modified readout signal 58 of FIG. 2B that still includes the high frequency modulation signals 52 and 54. The filtered readout signal 58 is transmitted through an amplifier 60 to one input of a phase comparator or detector 62 whose other input is connected to the output of the reference oscillator 14. The phase detector may be of the double balanced modulator type, such as that shown in *Electronic Engineer's Handbook*, edited by D. G. Fink, published by McGraw-Hill, 1975, pages 14–71 and 25–76. The phase detector compares the phase of the high frequency modulations 52 and 54 in the filtered readout signal 58 with the reference oscillator signal to produce a phase detector output signal 64, as shown in FIGS. 2C and 4. Since the high frequency modulation 52 is in phase with the reference oscillator signal, the output of the phase detector is zero at this time. However, since the phase of the high frequency modulation 54 is 180° out of phase with the reference oscillator signal, the phase detector output signal 64 is a negative going square wave during this time. The phase detector output maybe connected to a cathode ray oscilloscope 65 to display the waveform of the output signal 64 on the screen of such oscilloscope and determine the scanning time, t, between the opposite edges of the object, as shown in FIG. 4. The dimension of the object can then be determined by multiplying the scanning velocity by this time.

The output signal of the phase detector 62 is also applied to one input of a threshold voltage comparator 66 and switches such comparator to produce the output 70 of FIG. 2D when the amplitude of the detector output signal 64 exceeds a trigger voltage level set by a movable contact of a potentiometer 68 connected to another input of the voltage comparator. The positive square wave voltage comparator output signal 70 is transmitted through logic gates 71 and 73 to the inputs of two monostable multivibrators 72 and 74 that are triggered by positive going trigger pulses and negative going trigger pulses, respectively, As a result, the monostable multivibrator 772 is triggered by the positive going leading edge of the first threshold comparator output signal 70', and the other monostable multivibrator 74 is prevented from being triggered by gate 73. Therefore, multivibrator 72 acts as an in-phase to out-of-phase detector for the high frequency signal modulations 52 and 54. When triggered, the first monostable multivibrator 72 produces a narrow positive trigger pulse 76 which is applied to the set input of a bistable multivibrator or flip-flop 78 to trigger such flip-flop. The second monostable multivibrator 74 is triggered by the negative going trailing edge of the second comparator output pulse 70" to produce a narrow positive reset pulse 80 while the other multivibrator is prevented by gate 71 from being triggered. Pulse 80 is applied to the clear input of flip-flop 78 to revert such flip-flop to its original quiescent state. This causes the flip-flop to produce a positive going rectangular signal 82, as shown in FIG. 2E. It should be noted that the relative positions of the high frequency modulations 52 and 54 of the filtered detector readout signal 58 are reversed in the second readout signal when the light beams scan the second edge so that the 180° out-of-phase modulation 54 preceeds the in-phase modulation 52.

The output signal 82 of the flip-flop 78 is applied to one input of an AND gate 84 whose other input is connected to a clock pulse generator 86 source of high frequency digital clock pulses. The gated clock pulses 88 are transmitted from the output of the AND gate to a digital counter 90 whose output display indicates the dimension of the object measured between the two edges on opposite sides thereof which are crossed by the light beams.

Figure 5:
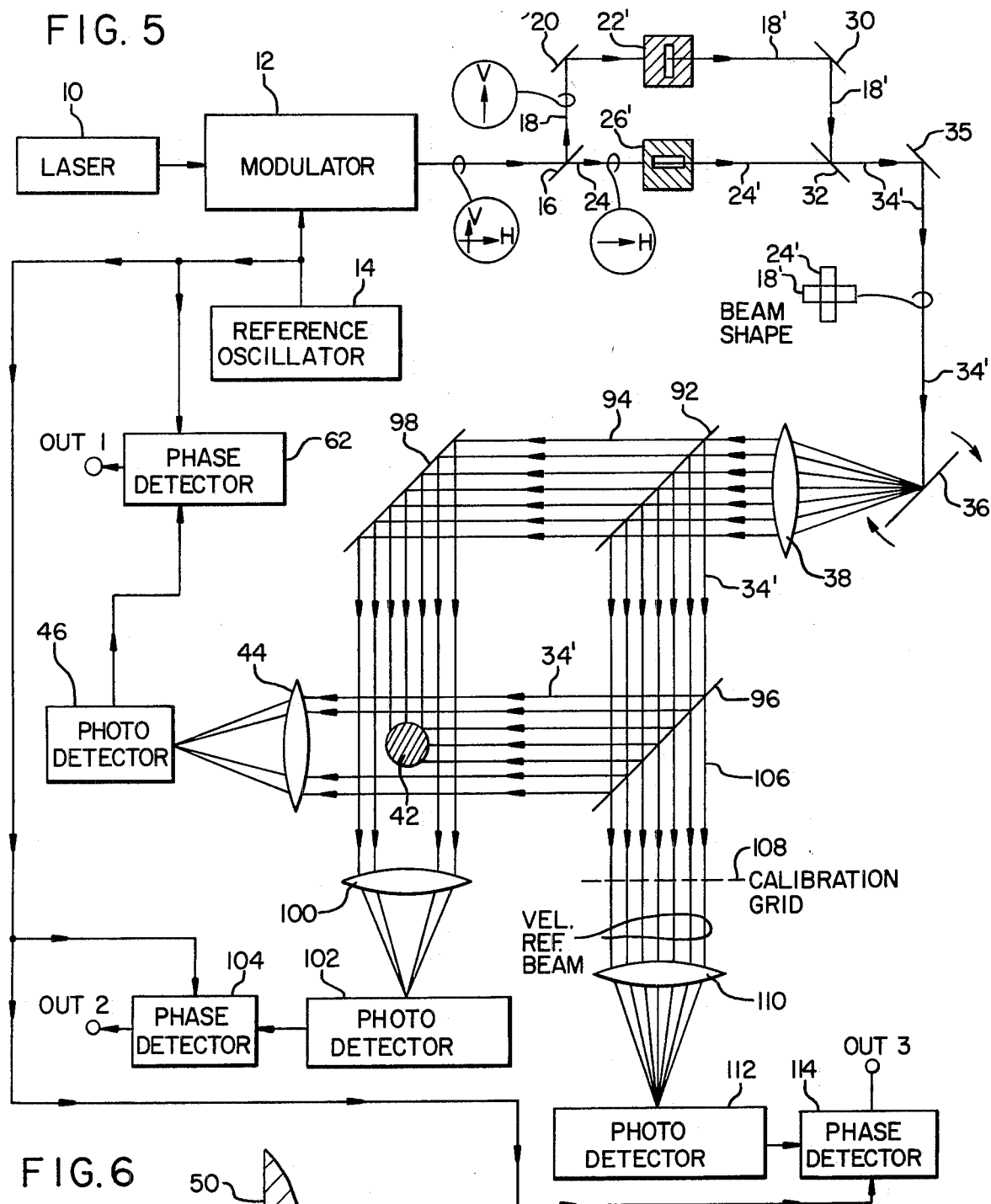
FIG. 5 is a schematic diagram of another embodiment of the present invention which is capable of measuring two different dimensions of the object simultaneously.

Another embodiment of the present invention is shown in FIG. 5 which is used to measure two dimensions of an object and is similar to that of FIG. 1 so that only the differences will be described and the same reference numerals will be used to designate like parts. In the extensometer of FIG. 5 the light beam masks 22' and 26' are provided with rectangular apertures to form pulsed light beams 18' and 24' of rectangular cross section. The cross sections of the pulsed light beams 18' and 24' intersect substantially perpendicular to one another and are superimposed only at their common center portions. Beams 18' and 24' are transmitted from the polarization sensitive mirror 32 as combined beams 34' which are reflected by the scanning mirror 36 through the focusing lens 38 to a first beam splitting mirror 92. One half of the energy of the combined light beams is reflected downward from mirror 92 as beams 34' and one half of such energy is transmitted through such mirror as combined light beams 94. The reflected portion of the combined light beams 94. The reflected portion of the combined light beams 34' is again reflected to the left by a second beam splitting mirror 96 toward the object 42 in the horizontal direction. The unblocked portion of beams 34' is transmitted through the second focusing lens 44 onto the photoelectric detector 46. Like FIG. 1, the output of the photocell 46 is filtered and amplified before it is applied to one input of the phase comparator 62 whose other input is connected to the reference oscillator 14. The output of the phase comparator 62 may be connected to a computer or to the threshold comparator and digital counter circuit of FIG. 1 to determine the dimension of the object in the vertical plane.

Similarly, the other two combined light beams 94 are reflected from another mirror 98 vertically downward past the object through a second focusing lens 100 onto a second light detector 102. The combined light beams 94 are focused onto a horizontal plane passing through the center of the object 42 to measure its maximum diameter in such plane by use of a second phase comparator 104 having one input connected to light detector 102 and its other input connected to the reference oscillator. This phase comparator 104 is similar to phase comparator 62 and may have its output connected to a computer or to a threshold comparator and digital counter circuit in a similar manner to phase comparator 62. As a result, two dimensions of the object 42 are measured in two mutually perpendicular directions simultaneously by the two combined light beams 34' and 94.

It may also be desirable to provide a velocity calibration light beam 106 by splitting off a small portion of the combined light beam 34' with beam splitting mirror 96 and transmitting it downward from mirror 96 through a calibration grid 108 of closely spaced light opaque lines to a focusing lens 110 which focuses the reference beam onto a third photocell detector 112. The output of the photocell 112 is transmitted to one input of a phase comparator 114 whose other input is connected to reference oscillator 14. The output of the phase detector 114 is a velocity measurement signal corresponding to the scanning velocity of the light beams as determined by scanning mirror 36. This velocity measurement signal serves as a reference for the scanning velocities of the two combined light beams 34' and 94 which scan the object 42. Thus the distance between the calibration grid lines is known, and the time the light beam takes to traverse this distance is measured so that the velocity of the light beam can be computed by dividing the known distance by such measured time. It should be noted that many systems do not require velocity compensation in which case the calibration beam 106 and calibration grid 108 can be eliminated. Also for systems employing a constant velocity scanner the calibration grid 108 can be replaced by a single reference aperture of known width. However, the use of the calibration grid has the advantage that short term scan velocity changes can be sensed and compensated for in the dimension calculation. Thus it enables the use of non-linear scanners such as oscillating mirrors which are capable of high scan rates but produce a sinusoidal scan velocity profile.

The intersecting rectangular beams 18' and 24' of each of the combined light beams 34' and 94 produce the high frequency modulated detector output signals similar to signal 48 of FIG. 3. Therefore the positions of the two intersecting rectangular light beams 18' and 24' corresponding to those of circular beams 18 and 24 have been shown on the left side of FIGS. 3A, 3B, 3C and 3D.

Figure 6:
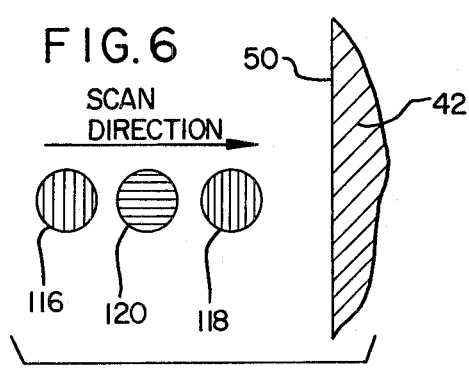
FIG. 6 shows a third embodiment of the present invention employing three light beams scanned consecutively across the edge of the object.

A third embodiment of the pulsed light beams used for scanning the opposite edges of an object 42 is shown in FIG. 6. In this embodiment, two outer light beams 116 and 118 of the same or two different light characteristics are provided on opposite sides of a middle light beam 120 of a different light characteristic from that of the two outer beams. In this embodiment, light beams 116 and 118 are both pulsed on and off simultaneously. When beams 116 and 118 are of the same characteristic they together provide a total light energy to the light energy of the middle beam 120. Thus light beams 116 and 118 are in effect different light beam segments of the same beam and may be produced by providing a single mask with two apertures in place of the mask 22 of FIG. 1. However, it should be noted that similar results can be achieved when the three beams 116, 118 and 120 are either of three different light characteristics or of the same light characteristic because such beams are separated and spatially distinguishable from each other since they are not superimposed like beams 18 and 24 or 18' and 24'.

The three light beams are arranged in a row so that they are sequentially scanned past the edge 50 of the object with beam 118 passing first, them beam 120 and finally beam 116. When beam 118 is totally covered by the object, a condition similar to that of FIG. 3B prevails. With one half of light beam 120 is covered by the object along with light beam 118, a condition is achieved similar to that of FIG. 3C. Similarly, when both light beams 118 and 120 are completely covered, the condition of FIG. 3D is achieved. Thus in all three embodiments of the light beams, two beam segments are provided on opposite sides of a third beam segment of different light characteristics and are scanned sequentially across the edge of the object in order to provide the two phase reversed high frequency signal modulations 52 and 54 in the readout signal 48 of the light detector. This enables the position of the edge of the object to be detected with extremely high accuracy with the phase detector.

The high accuracy of the optical extensometer of the present invention is extremely stable in spite of changes in the intensity of the laser light source. This is because it is the relative amount of two scanning light beams produced by the same source which is compared. Thus any drift in the total amount of light output of the source 10 does not affect the accuracy of the present system. Similarly any change in the efficiency of the light detector 46 and associated circuit will not affect the accuracy because the same detector measures both of the scanning light beams so there is no change in the relative amplitudes of the electrical signals produced by such beams. Finally since the output of the phase comparator is a binary voltage pulse of extremely fast rise time, detection of this pulse by the threshold voltage comparator does not vary even though the DC reference voltage applied by potentiometer 68 may change. Thus as long as the output pulse of the phase detector exceeds this threshold voltage, it will be switched to accurately measure the time that is required for the light beam to travel between the opposite edges of the object.

Figure 7:
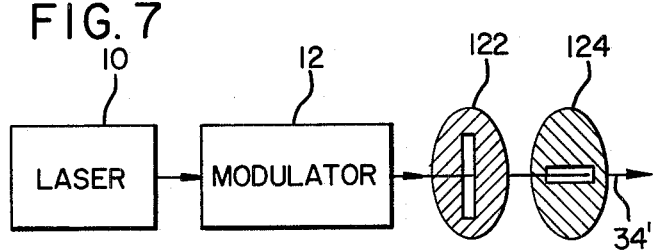
FIG. 7 is a schematic diagram showing polarizing masks which can be employed to produce the two oppositely polarized light beams which are used in one embodiment of the present invention.

Another modification of the invention is shown in FIG. 7 which is similar to that of FIG. 5 except that polarizing light masks 122 and 124 are employed in place of the light opaque masks 22' and 26'. This enables elimination of the polarization sensitive beam splitting mirrors 16 and 32 as well as the mirrors 20 and 30. Polarizing mask 122 blocks vertically polarized light except through its rectangular aperture, but allows all polarized plarized light to pass. Conversely, polarizing mask 124 blocks horizontally polarized light except through its rectangular aperture and allows vertically polarized light to pass. As a result the combined light beam 34' is produced with two pulsed beams 18' and 24' of rectangular cross section which are substantially perpendicular to each other and are of different polarized light. Of course the same thing could be done in the embodiment of FIG. 1 by replacing the light opaque masks 22 and 26 with similar polarizing masks having circular apertures.

It will be obvious to those having ordinary skill in the art that many changes may be made in the details of the above-described preferred embodiments of the present invention without departing from the spirit of the invention. Therefore, the scope of the present invention should only be determined by the following claims. We claim:

1. An optical dimensional measuring apparatus comprising:
    pulsed light beam generating means for producing a plurality of pulsed light beams which are alternatingly time modulated at the frequency of a reference signal to provide three beam segments positioned consecutively along a beam scanning direction with the outer two segments being distinguishable from the middle segment;

scanning means for scanning said light beams in said scanning direction across two opposite edges of an object to be measured;

detector means for detecting said light beams as they scan the opposite edges of said object to produce an electrical readout signal; and signal processor means for processing said readout signal to produce a measurement signal output when the scanned light beams cross the opposite edges of said object.

2. Apparatus in accordance with claim 1 in which the light beams are of different light characteristics of the same total light energy.

3. Apparatus in accordance with claim 2 in which the outer two segments are of one light characteristic and the middle segment is of another light characteristic and the total light energy of the two outer segments is substantially the same as that of the middle segment.

4. Apparatus in accordance with claim 1 in which the two outer segments are spatially separate from each other and from the middle segment.

5. Apparatus in accordance with claim 1 in which the light beams are of different cross sectional geometries.

6. Apparatus in accordance with claim 1 which also includes indicator means for indicating the dimensional distance between said opposite edges of said object in response to aid measurement signal.

7. Apparatus in accordance with claim 1 in which the signal processor means is a phase comparator means for comparing the phase of said readout signal with said reference signal to produce said measurement signal.

8. Apparatus in accordance with claim 7 in which the light beam generating means produces two pulsed light beams of different cross sectional geometries and two different light characteristics but of substantially the same total light energy which intersect each other to provide said middle beam segment at their intersection.

9. Apparatus in accordance with claim 8 in which the two light beams are of different diameter circular cross sections and the smaller diameter beam is superimposed on and centered on the larger diameter beam.

10. Apparatus in accordance with claim 8 in which the two light beams are of rectangular cross sections which intersect each other substantially perpendicularly.

11. Apparatus in accordance with claim 10 in which the scanning means scans the two light beams across said opposite edges in a direction which is substantially parallel to the length of one beam section so that said one beam passes over the edges before and after the other beam.

12. Apparatus in accordance with claim 7 in which the phase comparator means is a double balanced demodulator and the measurement signal produced at the output of such demodulator has a binary level transition at a time corresponding to the scanning of the edge of said object.

13. Apparatus in accordance with claim 1 in which the light beams are polarized with a different polarity.

14. Apparatus in accordance with claim 13 in which the light beam generating means includes two light polarizing masks having axially aligned beam defining apertures therethrough, said masks being oppositely polarized to block vertical or horizontally polarized light except through the aperture.

15. Apparatus in accordance with claim 1 in which the light beams are of different wavelength light.

16. Apparatus in accordance with claim 1 in which the light beam segments are provided by three light beams including two outer light beams of two different light characteristics and a middle light beam of a third light characteristic between said two outer beams.

17. Apparatus in accordance with claim 1 in which the light beam segments are provided by three light beams including first and second beams of the same light characteristic and a third beam of a different light characteristic positioned between said first and second beams, said third beam having substantially the same total light energy as the sum of said first and second beams.

18. Apparatus in accordance with claim 17 in which the scanning means scans the three light beams across said opposite edges so that said first beam crosses the edges before said third beam and said second beam crosses the edges after said third beam.

19. An optical dimensional measuring apparatus comprising:

pulsed light beam generating means for producing a plurality of pulsed light beams which are alternatingly time modulated at the frequency of a reference signal, to provide three beam segments positioned consecutively along a beam scanning direction with the outer two segments being of a different light characteristic than the middle segment but of substantially the same total light energy as said middle segment;

scanning means for scanning said light beams in said scanning direction across two opposite edges of an object to be measured;

detector means for detecting said light beams as they scan the opposite edges of said object to produce an electrical readout signal; and phase comparator means for comparing the phase of said readout signal with said reference signal to produce a measurement signal output when the scanned light beams cross said opposite edges.

20. Apparatus in accordance with claim 19 which also includes indicator means for indicating the dimensional distance between said opposite edges of said object in response to said measurement signal.

21. Apparatus in accordance with claim 19 in which the light beams are two beams of different diameters superimposed and centered on each other so that the smaller diameter beam provides the middle beam segment.

22. Apparatus in accordance with claim 19 in which the light beams are two beams of rectangular cross section which intersect each other substantially perpendicularly so that their central portions are superimposed and provide the middle beam segment.

23. Apparatus in accordance with claim 19 in which the light beam generating means produces two sets of light beams which intersect different portions of the object to measure different dimensions of said object with each set.

24. Apparatus in accordance with claim 19 in which a beam splitter means separates reference beam portions from the scanned light beams before they strike the object, and causes said reference beam portions to scan across a velocity calibration grid to produce a modulated reference beam, light detector means for detecting the modulated reference beam to produce a velocity calibration signal, and phase comparator means for comparing said calibration signal with said reference signal to provide a scanning velocity measurement signal.

* * * * *

UNITED STATES PATENT OFFICE    Page 1 of 2
CERTIFICATE OF CORRECTION

Patent No. 4,129,384          Dated  December 12, 1978

Inventor(s)   RAY A. WALKER ET AL

It is certified that error appears in the above-identified patent and that said Letters Patent are hereby corrected as shown below:

Abstract, line 22, after "intersect" delete "with."

Column 2, line 23, "sysem" should be --system--.

Column 2, line 47, "of" should be --or--.

Column 3, line 17, "with" should be --when--.

Column 4, line 5, "miror 16" should be --mirror 16--.

Column 5, line 53, "772" should be --72--.

Column 6, line 36, after "light beams 94" delete --The reflected por- --.

Column 6, line 37, delete "tion of the combined light beams 94."

Column 7, line 66, "With" should be --When--.

Column 7, line 49, insert --equal-- after "energy."

UNITED STATES PATENT OFFICE
CERTIFICATE OF CORRECTION

Patent No. 4,129,384                    Dated December 12, 1978

Inventor(s)    RAY A. WALKER ET AL

It is certified that error appears in the above-identified patent and that said Letters Patent are hereby corrected as shown below:

Column 8, line 42, "polarized plarized" should be --horizontally polarized--.

Column 9, claim 6, line 26, "aid" should be --said--.

Signed and Sealed this

*Fourth* Day of *March 1980*

[SEAL]

*Attest:*

SIDNEY A. DIAMOND

*Attesting Officer*   *Commissioner of Patents and Trademarks*